United States Patent
Ryim et al.

(10) Patent No.: US 10,179,286 B2
(45) Date of Patent: Jan. 15, 2019

(54) METHOD OF REPLAYING GAME VIDEO USING CAMERA INFORMATION CALIBRATION

(71) Applicant: MINKONET CORPORATION, Seoul (KR)

(72) Inventors: Won Gil Ryim, Gyeonggi-Do (KR); Tae Woo Kim, Gyeonggi-Do (KR); Dong Hwal Lee, Seoul (KR)

(73) Assignee: MINKONET CORPORATION, Seoul (KR)

( * ) Notice: Subject to any disclaimer, the term of this patent is extended or adjusted under 35 U.S.C. 154(b) by 273 days.

(21) Appl. No.: 15/247,923

(22) Filed: Aug. 26, 2016

(65) Prior Publication Data

US 2018/0056189 A1 Mar. 1, 2018

(51) Int. Cl.
| | |
|---|---|
| A63F 9/24 | (2006.01) |
| A63F 13/00 | (2014.01) |
| G06F 17/00 | (2006.01) |
| G06F 19/00 | (2018.01) |
| A63F 13/5258 | (2014.01) |
| A63F 13/25 | (2014.01) |
| A63F 13/497 | (2014.01) |

(52) U.S. Cl.
CPC .......... *A63F 13/5258* (2014.09); *A63F 13/25* (2014.09); *A63F 13/497* (2014.09); *A63F 2300/8082* (2013.01)

(58) Field of Classification Search
CPC . A63F 13/525; A63F 13/5252; A63F 13/5258
See application file for complete search history.

(56) References Cited

U.S. PATENT DOCUMENTS

| | | | | |
|---|---|---|---|---|
| 5,779,548 A | * | 7/1998 | Asai | A63F 13/10 |
| | | | | 463/1 |
| 6,699,127 B1 | * | 3/2004 | Lobb | A63F 13/10 |
| | | | | 345/418 |
| 2009/0253507 A1 | | 10/2009 | Ishii et al. | |
| 2016/0317913 A1 | * | 11/2016 | Chen | A63F 13/92 |

FOREIGN PATENT DOCUMENTS

| | | |
|---|---|---|
| JP | H10216357 | 8/1998 |
| KR | 20000059204 | 10/2000 |
| KR | 20030066180 | 8/2003 |
| KR | 20060129983 | 12/2006 |

(Continued)

*Primary Examiner* — Milap Shah
*Assistant Examiner* — Jason Pinheiro
(74) *Attorney, Agent, or Firm* — JCIPRNET

(57) ABSTRACT

Provided is a method of replaying a game video using camera information calibration, and more particularly, to a method of replaying a game video using camera information calibration, in which a game video is replayed by calibrating information related to operation of a camera in a virtual space so as to provide users with game videos that are convenient to view.

According to the method of replaying a game video using camera information calibration, movement of a camera that captures a video of a virtual space may be effectively controlled when replaying a game play situation so that inconvenience caused to a viewer who views the replay video is minimized and the viewer may conveniently view the game replay video for a long period of time.

6 Claims, 1 Drawing Sheet

(56) References Cited

FOREIGN PATENT DOCUMENTS

| | | |
|---|---|---|
| KR | 20080035287 | 4/2008 |
| KR | 100932675 | 12/2009 |
| KR | 20100137792 | 12/2010 |
| KR | 20110081400 | 7/2011 |
| KR | 101353531 | 1/2014 |
| KR | 101604250 | 3/2016 |
| KR | 101643102 | 8/2016 |
| KR | 101644496 | 8/2016 |
| KR | 20160096019 | 8/2016 |

* cited by examiner

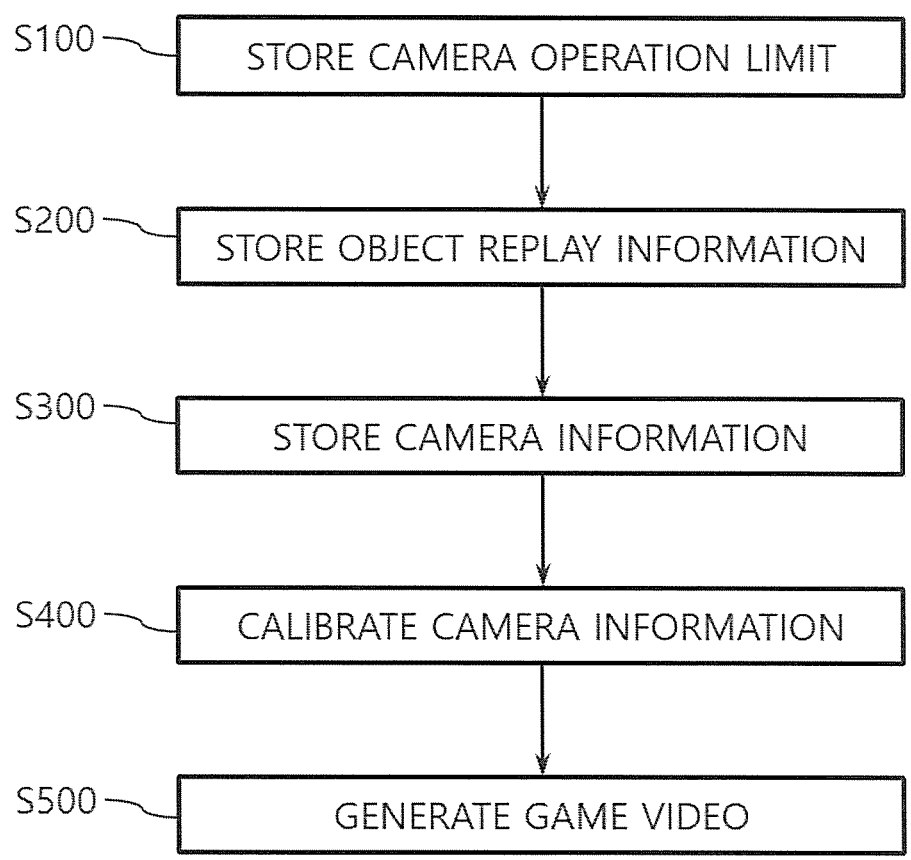

METHOD OF REPLAYING GAME VIDEO USING CAMERA INFORMATION CALIBRATION

TECHNICAL FIELD

The present disclosure relates to a method of replaying a game video using camera information calibration, and more particularly, to a method of replaying a game video using camera information calibration, in which a game video is replayed by calibrating information related to operation of a camera in a virtual space so as to provide users with game videos that are convenient to view.

BACKGROUND ART

With the increase in the number of game users, more users view game play videos via the Internet or broadcasting.

Game play videos may be replayed and viewed in various manners. A game player may record his or her game play situation and view the recorded video on his or her terminal, or may upload the recorded video to a server such as YouTube for others to view. In addition, a game play situation may be relayed in real time via cable broadcasting or Internet broadcasting.

When replaying and viewing a game play video, a user may feel dizzy according to circumstances. That is, if a game player abruptly changes a direction or a fast-moving image in three-dimensional virtual space is replayed or if an image is zoomed in and out at a high speed, viewers may often feel dizzy or experience nausea.

DESCRIPTION OF THE INVENTION

Provided is a method of replaying a game video using camera information calibration so as to minimize inconvenience to viewers.

According to an aspect of the present invention, there is provided a method of replaying a game video using camera information calibration, the method including: (a) storing a maximum variation over time of at least one of a location, an angle, and an angle of view of a camera, as a camera operation limit, wherein the camera captures a video of a game play situation in a virtual space; (b) defining a thing, a character, and a background appearing in a three-dimensionally defined virtual space of a game as objects and storing movements of the objects in the virtual space over time during a game play, as object replay information; (c) storing locations, angles, and angles of view of the camera over time, as cameras information, wherein the camera captures a video of a game play situation in the virtual space; (d) when a variation over time of at least one of the location, the angle, and the angle of view of the camera of the camera information exceeds the camera operation limit, calibrating the camera information to a value within a range of the camera operation limit; and (e) after performing (d), replaying a game play situation by generating image frames in real time by incorporating the object replay information and the camera information calibrated in (d) and continuously displaying the image frames on a screen.

According to the method of replaying a game video using camera information calibration, movement of a camera that captures a video of virtual space may be effectively controlled when replaying a game play situation so that inconvenience to a viewer who views a game replay video is minimized and the viewer may view the game replay video conveniently for a long period of time.

BRIEF DESCRIPTION OF THE DRAWING

FIG. 1 is a flowchart of a method of replaying a game video using camera information calibration, according to an embodiment of the present invention.

DETAILED DESCRIPTION OF THE INVENTION

Hereinafter, a method of replaying a game video using camera information calibration according to the present invention will be described more fully with reference to the attached drawing.

FIG. 1 is a flowchart illustrating a method of replaying a game video using camera information calibration according to the present invention.

The method of replaying a game video using camera information calibration according to the present invention may be used in replaying a game play situation based on game play data or used for broadcasting via a network.

The method of replaying a game video using camera information calibration according to the present invention may be used in replaying a game play situation of games developed using a game development tool such as Unity3D whereby games are developed by defining movement of objects such as things, characters, or backgrounds, appearing in a virtual space.

According to the present invention, convenience in terms of watching a game video may be provided to users by replaying a game video after limiting movement of a camera so as to prevent a too fast movement of the camera.

To this end, first, a replay terminal replaying a game video stores a maximum value of a variation over time of at least one of a location, an angle, and angle of view of a camera that captures a video of a game play situation in a virtual space, as a camera operation limit in step (a) (S100).

The camera operation limit may be preset by a user to be stored or may be set by a service provider providing a service of the game video replay method using calibrating camera information according to the present invention. A terminal replaying a game play situation receives and stores the camera operation limit.

The camera operation limit may be set using various methods. The camera operation limit is typically set by setting, a maximum value of a variation over time of camera information, such as a location, an angle or an angle of view of a virtual camera capturing a video of a game play situation of a virtual space.

The camera operation limit may be set in the form of an upper limit of a first derivative of a location, an angle or an angle of view of a camera with respect to time. That is, the camera operation limit is set such that a variation of camera information per a unit time does not exceed a designated value.

According to circumstances, the camera operation limit may be set in the form of an upper limit of a second derivative with respect to time of a location, an angle or an angle of view of a camera. That is, the camera operation limit may be set such that a rate of change of the camera information per a unit time does not exceed a designated value.

In this state, the replay terminal defines things, characters, or backgrounds appearing in a three-dimensionally defined virtual space, as objects in order to replay a game play situation, and stores movements of the objects in the virtual space over time as object replay information in step (b) (S200). The object replay information is stored when the replay terminal replaying a game monitors movements of the objects over time. When a game video is replayed using a terminal that played a game, the stored object replay information is used. When a terminal receives a game play situation via, for example, broadcasting to replay the same, the terminal receives and stores game replay information from a server. Movements of objects over time may be stored using various methods. For example, serial numbers, coordinates, and directions of objects in a virtual space may be stored as numerical data in accordance with respective image frames displayed on a screen during a game play. Alternatively, object replay information corresponding to a predetermined period of time may be stored, or in real-time broadcasting of a game, object replay information may be received in real time to be stored.

Next, the replay terminal stores locations, angles, and angles of view of a camera that captures a video of a game play situation in a virtual space, over time, as camera information in step (c) (S300). Information regarding movements of a camera that captures videos of movements of the objects within a virtual space that may be realized based on the object replay information stored in step (b) described above, is received as camera information to be stored. For example, camera information of sports games such as golf or baseball corresponds to information about movements of a camera that usually moves along a movement of a ball. In the case of a first person shooting game, a camera moves at the back of a player while capturing videos of movements of the player. In this case, camera information corresponds to information about locations and angles of the camera that moves along the movement of the player.

When the object replay information and the camera information are prepared as described above, the replay terminal may replay a game play situation in real time by incorporating the object replay information with the camera information.

According to the present invention, before generating a game replay video by incorporating the object replay information and the camera information to each other as described above, the replay terminal may examine the camera information to calibrate the same.

In step (d) of calibrating the camera information (S400), if a variation over time of at least one of a location, an angle, and an angle of view of a camera of the camera information exceeds the camera operation limit, the replay terminal calibrates the camera information to a value within a range of the camera operation limit.

The camera information may be calibrated to a value within a range of the camera operation limit by using various methods. In any case, the camera information is calibrated such that a change in the camera information is minimized so as to reduce inconvenience that may occur to a user when watching a game video.

As described above, when a camera operation limit is set in the form of an upper limit of a first derivative of locations, angles, and angles of view of a camera with respect to time in step (a) as described above, and if a variation over time of at least one of the locations, the angles, and the angles of view of the camera exceeds the camera operation limit, the replay terminal calibrates the camera information to a value of the camera operation limit. That is, the camera information is calibrated such that a rate of change of the camera information over time is limited within a range of the camera operation limit. When the rate of change of the camera information is limited within the range of the camera operation limit as described above, a situation where a camera moving speed or a camera rotating speed is too fast for a user to properly watch a game play situation may be prevented. In addition, when viewing a game play video that is in the form of a virtual reality (VR) video, the user may be protected from feeling dizzy or experiencing nausea due to sudden changes in a game replay screen, thereby providing an environment in which the user may view the game video for a long time without losing interest.

As described above, when the camera operation limit is set in the form of an upper limit of a second derivative with respect to time of a location, an angle or an angle of view of a camera in step (a), also in step (d), if an absolute value of a second differential coefficient with respect to time of at least one of the location, the angle, and the angle of view of the camera of the camera information exceeds the camera operation limit, the replay terminal calibrates the camera information to a value of the camera operation limit. That is, by applying the acceleration concept, the camera information is calibrated such that the camera moves or rotates at a speed that is within the range of the camera operation limit.

Step (d) of calibrating the camera information as described above may be modified in various manners. The camera information may be calibrated by combining the concepts of speed and acceleration. According to circumstances, the camera information may be calibrated not based on a rate of change over time but based on space. Different camera operation limits may be set with respect to each area of a virtual space, and the camera information may be calibrated based on different standards according to a location of the camera.

Meanwhile, if the camera information does not exceed the camera operation limit, the camera information needs not be calibrated.

When step (d) is completed as described above, the replay terminal may generate an image frame in real time by incorporating the object replay information and the camera information to continuously display the image frames on the screen, thereby replaying a game play situation in step (e) (S500).

A game play situation may be replayed after storing object replay information and camera information corresponding to a predetermined period of time, in the replay terminal, and incorporating the object replay information and the camera information. Alternatively, a replay video may be generated after performing step (d) described above by receiving, via a network, object replay information and camera information of a game that is played in real time as in broadcasting.

When replaying a game play situation as described above, as a game situation is replayed using the same object replay information as that of the game play situation, the game situation may be replayed at various resolutions depending on the circumstances. For example, during a game play, the game may be played at a low resolution on a screen, but when replaying a game replay video, the game replay video may be generated and viewed at a high resolution according to the type of the replay terminal. In addition, while a game may be played and displayed on a typical two-dimensional display on a screen during a game play, when replaying a game replay video, the game replay video may be generated as a VR image or a three-dimensional image to be displayed.

In addition, even if object replay information is stored such that it is rather difficult to understand a game situation based on the object replay information as the screen is shifted or changed very quickly due to user's abrupt manipulation during a game play, when replaying a game situation, a user may view the game situation in a convenient manner.

While the present invention has been described with reference to preferred embodiments above, the scope of the present invention is not limited to the embodiments described and illustrated above.

For example, it is described above that the replay terminal calibrates camera information by performing step (d) regardless of the type of replay videos to be generated. However, according to circumstances, the method of replaying a game video using camera information calibration according to the present invention may be performed such that the replay terminal performs step (d) to calibrate camera information only when a VR image is generated in step (e). As a VR image is more likely to cause dizziness or inconvenience to the user than a typical game video, the replay terminal may calibrate camera information only when a VR image is generated so as to mitigate an abrupt change in the camera information.

In addition, while a location, an angle and an angle of view of a camera are defined as camera information above, other variables such as a focal length of a camera may also be treated as camera information to examine and calibrate a variation in step (d).

While this invention has been particularly shown and described with reference to various embodiments thereof, the present invention should not be construed as being limited to the embodiments set forth herein; various changes, combinations, and modifications may be made therein without departing from the spirit and scope of the present invention as defined by the appended claims.

What is claimed is:

1. A method of replaying a game video using camera information calibration, the method comprising:
   (a) storing, by a processor, a maximum variation over time of at least one of a location, an angle, and an angle of view of a camera, as a camera operation limit, wherein the camera captures a video of a game play situation in a virtual space;
   (b) defining, by the processor, a thing, a character, and a background appearing in a three-dimensionally defined virtual space of a game as objects and storing movements of the objects in the virtual space over time during a game play, as object replay information;
   (c) storing, by the processor, locations, angles, and angles of view of the camera over time, as cameras information, wherein the camera captures a video of a game play situation in the virtual space;
   (d) when a variation over time of at least one of the location, the angle, and the angle of view of the camera of the camera information exceeds the camera operation limit, calibrating, by the processor, the camera information to a value within a range of the camera operation limit; and
   (e) after performing (d), generating, by the processor, image frames in real time by incorporating the object replay information and the camera information calibrated in (d) and displaying the image frames on a screen continuously for replaying a game play situation.

2. The method of claim 1, wherein
   in (a), the camera operation limit is set and stored in the form of an upper limit of a first derivative of the location, the angle, and the angle of view of the camera with respect to time, and
   in (d), when an absolute value of a first differential coefficient with respect to time of at least one of the location, the angle, and the angle of view of the camera information exceeds the camera operation limit, the camera information is calibrated to a value of the camera operation limit.

3. The method of claim 1, wherein
   in (a), the camera operation limit is set and stored in the form of an upper limit of a second derivative with respect to time of the location, the angle, and the angle of view of the camera, and
   in (d), when an absolute value of a second differential coefficient with respect to time of at least one of the location, the angle, and the angle of view of the camera information exceeds the camera operation limit, the camera information is calibrated to a value of the camera operation limit.

4. The method of claim 1, wherein (d) is performed only when a game replay video to be generated in (e) is a virtual reality (VR) video.

5. The method of claim 2, wherein (d) is performed only when a game replay video to be generated in (e) is a virtual reality (VR) video.

6. The method of claim 3, wherein (d) is performed only when a game replay video to be generated in (e) is a virtual reality (VR) video.

* * * * *